(12) United States Patent
Sorrentino

(10) Patent No.: US 9,937,593 B2
(45) Date of Patent: Apr. 10, 2018

(54) METHOD, APPARATUS AND PLANT FOR CUTTING AND FITTING A CAP ONTO THE OPPOSITE CUT ENDS OF A PIPE

(71) Applicant: F.B. BALZANELLI AVVOLGITORI S.P.A., Milan (IT)

(72) Inventor: Marco Sorrentino, Milan (IT)

(73) Assignee: F.B. BALZANELLI AVVOLGITORI S.P.A., Milan (IT)

( * ) Notice: Subject to any disclaimer, the term of this patent is extended or adjusted under 35 U.S.C. 154(b) by 237 days.

(21) Appl. No.: 14/264,181

(22) Filed: Apr. 29, 2014

(65) Prior Publication Data

US 2014/0317904 A1 Oct. 30, 2014

(30) Foreign Application Priority Data

Apr. 30, 2013 (IT) .................................. MI13A0709

(51) Int. Cl.
*B23P 19/02* (2006.01)
*B65H 75/50* (2006.01)
*B65H 81/00* (2006.01)

(52) U.S. Cl.
CPC .............. *B23P 19/02* (2013.01); *B65H 75/50* (2013.01); *B65H 81/00* (2013.01); *Y10T 29/49826* (2015.01); *Y10T 29/53417* (2015.01)

(58) Field of Classification Search
CPC ......... B23P 19/02; B65H 75/50; B65H 81/00; Y10T 29/49826; Y10T 29/53417
See application file for complete search history.

(56) References Cited

U.S. PATENT DOCUMENTS

| | | | | |
|---|---|---|---|---|
| 3,720,992 A | * | 3/1973 | Hyatt | ...................... B23P 23/04 29/240 |
| 4,195,399 A | | 4/1980 | Rasmussen et al. | |
| 2006/0254057 A1 | * | 11/2006 | Houseman | ............... B25D 1/02 30/92 |

FOREIGN PATENT DOCUMENTS

| | | | | |
|---|---|---|---|---|
| EP | 1227054 A1 | 7/2002 | | |
| EP | 2799382 A1 | * 11/2014 | ............. | B23P 19/02 |
| GB | 1388393 A | 3/1975 | | |
| JP | 6241350 | * 8/1994 | | |
| WO | WO-8807494 A1 | 10/1988 | | |
| WO | WO-08107629 A1 | 9/2008 | | |

* cited by examiner

*Primary Examiner* — John C Hong
(74) *Attorney, Agent, or Firm* — Mintz Levin Cohn Ferris Glovsky and Popeo, P.C.

(57) ABSTRACT

Method for fitting caps by means of an automatic apparatus onto at least one end of a pipe, fed in a longitudinal direction by a pipe-feeding machine and directed to a machine for bundling the pipe, wherein said apparatus being movable alternately in both senses of the longitudinal direction between two opposite end-of-travel ends, i.e. rear end facing the feeding machine, and front end opposite to the rear end.

30 Claims, 4 Drawing Sheets

METHOD, APPARATUS AND PLANT FOR CUTTING AND FITTING A CAP ONTO THE OPPOSITE CUT ENDS OF A PIPE

CROSS-REFERENCE TO RELATED APPLICATIONS

This application claims priority to Italian Patent Application No. MI2013A000709 filed on Apr. 30, 2013, the entire content of which is hereby expressly incorporated by reference herein in its entirety.

FIELD

The present disclosure relates to a method and an apparatus for cutting the opposite ends of a pipe and fitting a cap onto them.

BACKGROUND

It is known, in the technical sector for the production and winding, in spool form, of pipes and the like, that said pipes are generally formed by means of extrusion of a plastic material, that the formed pipes are output from the extruder continuously and fed to a winding machine which grips, pulls and winds them in spool form onto a rotating reel, cutting them also to size when the programmed final length of the wound spool is reached.

In the case where pipes are produced in bar form, the extruded pipe is instead fed to a cutting and packaging machine.

It is also known that, in order to perform cutting to size of the wound pipe, the current technology envisages using devices for measuring the pipe fed to the spooling machine and passing through a predefined marker point.

Further measurement and cutting methods use synchronization means with meter-counting wheels or optical readers of marks present on the pipe, which are connected to and synchronized with cutting means mounted on operating machines.

In this connection it is also known that, for certain types of production or for the particular requirements of certain markets, the inside of the pipe must be protected and absolutely free from any type of debris and/or foreign matter which may become lodged inside the pipes during the normal storage, transportation and laying operations. U.S. Pat. No. 3,720,992 A illustrates an apparatus for cutting pipes and fitting caps onto the cut end according to the preamble of claim 10.

Further examples of the prior art are illustrated in WO 88/07494 A1, GB 1,388,393 A, WO 2008/107629 A1 and U.S. Pat. No. 4,195,399 A.

SUMMARY

It is therefore necessary to fit closing caps onto the opposite ends of the pipe, whether they be wound in spool form or packaged as bars.

The caps which may be fitted onto the pipe in bar form or wound as a spool (FIG. 1) may be of various types: smooth, internal-fitting 1a or external-fitting 1b, for smooth pipes 1 onto which they are applied by means of pressure, or threaded 2a in the case of a pipe 2 with a helical grooving onto which they are fitted by means of screwing.

According to the current state of the art, the cap is fitted manually onto the pipe once the procedure for winding the pipe onto spools has been completed or once the pipe bar has been formed. This manual procedure requires manual operations by an operator and in some cases is also very laborious owing to the large dimensions and weight of the wound spools and/or the length of the pipe in bar form. Manual fitting of the cap at the end of the cycle therefore constitutes an additional step in the production sequence which increases the packaging time and reduces productivity.

The technical problem which is posed, therefore, is to provide a method and an apparatus for fitting caps onto the opposite ends of a cut pipe which is able to provide a solution to the aforementioned problems of the prior art.

In connection with this problem it is also required that said method and apparatus should be able to perform also the cutting to size of the pipe itself and be able to be automated and incorporated into the normal cycle for the production and winding or packaging of the pipe spools or bars, without adversely affecting the overall duration of the production cycle.

It is also desirable that this apparatus should have small dimensions, be easy and inexpensive to produce and assemble and be able to be easily installed at any user premises, including on already existing machines, by means of conventional standardized means.

These results are obtained according to the present disclosure by a method according to the characteristic features disclosed herein, by an apparatus for performing cutting and fitting caps onto the ends of cut pipes according to the characteristic features disclosed herein, and by a plant for forming, cutting, capping and bundling pipes according to the embodiments disclosed herein.

BRIEF DESCRIPTION OF THE DRAWINGS

Further details may be obtained from the following description of non-limiting examples of embodiments of the subject matter of the present disclosure, provided with reference to the accompanying drawings, in which.

DETAILED DESCRIPTION

As shown in FIGS. 2 to 7 and assuming solely for the purposes of simplification of description and without a limiting meaning a set of three reference axes perpendicular to each other and with directions in a longitudinal direction X-X, corresponding to the longitudinal extension and direction of movement of a pipe 1,2; transverse direction Y-Y corresponding to the width and vertical direction Z-Z corresponding to the height, as well as front part corresponding to the side where the pipe 1,2 is output from the apparatus and rear part corresponding to the side where the pipe enters the apparatus, the apparatus according to embodiments of the disclosure for cutting a pipe 1,2 and for fitting caps 1a,2a onto the opposite cut ends of the pipe will be described below with reference to the example illustrated of a pipe 1,2 to be wound in spool form by means of a winding machine A.

Figure 9:
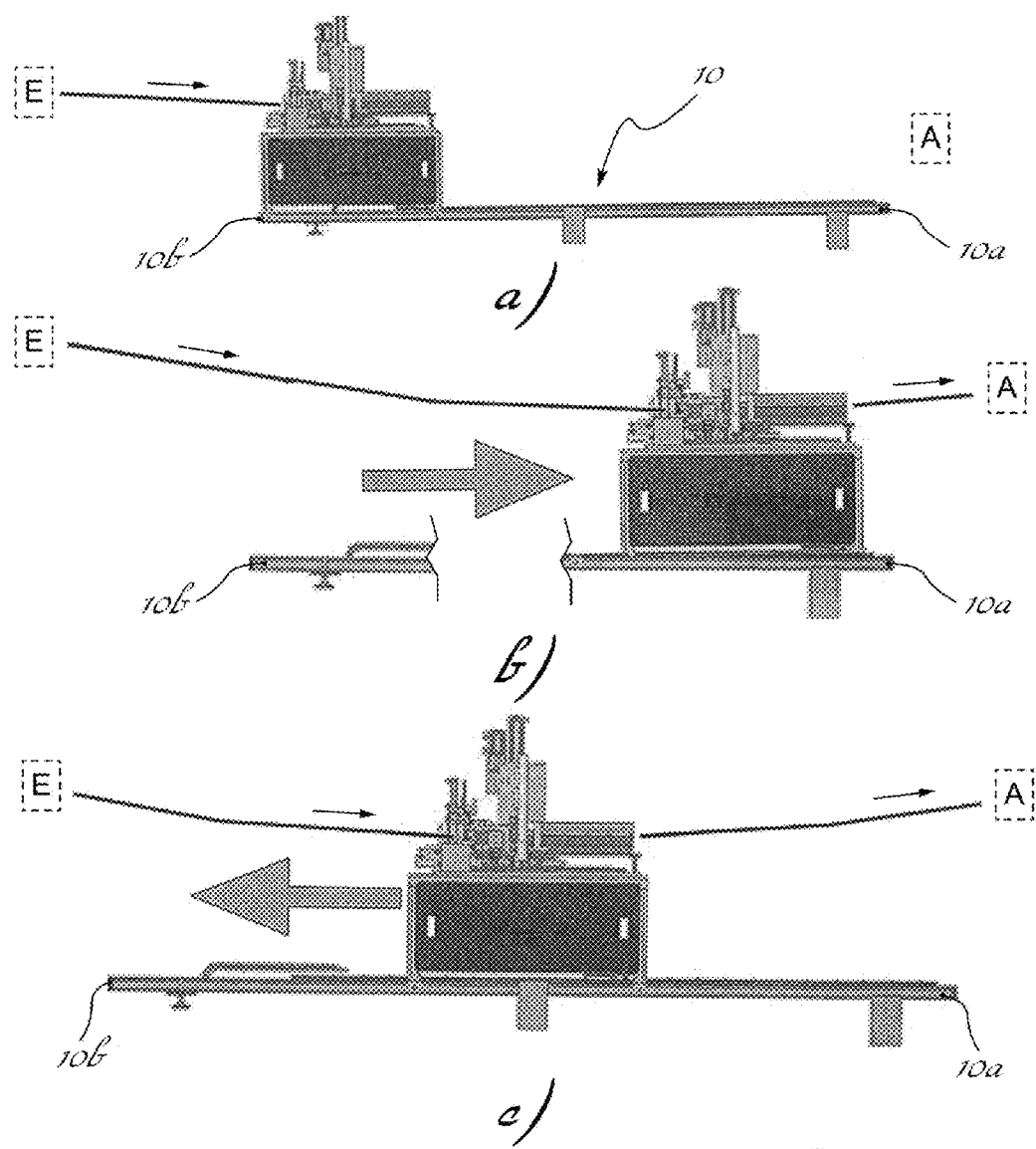

According to this possible configuration (FIG. 9) the apparatus: is arranged between the output end of a pipe extruder E and the input end of a machine A for winding the pipes onto spools, is movable alternately to-and-fro in both senses of the longitudinal direction (X-X) between two opposite end-of-travel ends, i.e. rear end (10b) facing the feeding machine (E), and front end (10a) opposite to the rear end and comprises essentially:

a rear unit 20 for driving the pipe 1,2 supplied from the extruder E;

a pipe gripping unit 30;

a unit 40 for cutting the pipe 1,2;

a unit 50 for inserting the caps 1a,2a into the line and fitting them onto the ends of the pipe 1,2.

The apparatus may comprise a support and guide structure 10 extending in the longitudinal direction X-X between two ends, i.e. rear end 10b facing the extruder E and front end 10a facing the winder A, for the movement of the apparatus between said end-of-travel positions.

In greater detail, with reference to the embodiment shown in the figures, it is envisaged that:

said unit 20 for driving the pipe 1,2 comprises:

a pair of belts 21 arranged parallel to the longitudinal direction X-X and endlessly wound around a respective pair of rollers 22 in turn aligned in pairs along the longitudinal direction X-X, at least one of the two rollers of the pair being motorized for rotational operation of the belts 21; the two belts 21 with associated rollers are mounted on an associated slide 23 displaceable in both senses of the transverse direction Y-Y from a position spaced apart, for opening, and a position close together, for closing the belts 21 onto the pipe 1,2 with which they engage for driving thereof;

said pipe gripping unit 30 comprises:

a first pair of jaws 31a situated opposite each other and movable in the transverse direction Y-Y upon operation of associated means 31c from a position spaced apart, for opening and disengagement from the pipe 1,2, and a position close together, for closing, gripping and retaining the pipe 1,2;

a second pair of jaws 31b arranged alongside the first jaws 31a and in front of the latter in the longitudinal direction X-X, also situated opposite each other and movable upon operation in the transverse direction Y-Y, from an open position for disengagement from the pipe 1,2 into a closed position for gripping and retaining the pipe 1,2;

at least one of said two pairs of jaws 31a,31b, preferably the front pair in the longitudinal direction X-X, is able to move, upon operation of movement means 32—for example of the pneumatic type—in both senses of the longitudinal direction X-X, from a position close to the other pair of jaws, corresponding to a position for cutting the pipe, into a position spaced from said other pair of jaws, corresponding to a position for fitting a cap 1a,2a, as will emerge more clearly below.

Preferably, both pairs of jaws 31a,31b are movable upon operation of respective movement means 32 in both senses of the longitudinal direction X-X, so as to maintain symmetry during the movements and reduce the separating/closing time of the pairs of jaws 31a,31b;

a unit 40 for cutting the pipe 1,2 comprising:

a cutting blade 41 of the guillotine type extending in the transverse direction Y-Y and movable along respective guides 41a in both senses of the vertical direction Z-Z, upon controlled operation of an associated electrical and/or pneumatic actuator;

conveniently, the cutting unit is arranged in such a position in the longitudinal direction X-X as to be substantially centred with respect to the two jaws 31a,31b, when they are in the position close together;

the unit 50 for inserting the caps 1a,2a into the line and fitting them onto the ends of the pipe 1,2 comprises essentially:

at least one first transverse arm 51, a first end of which carries means 52 for gripping and fitting a cap 1a,2a onto the pipe 1,2 and the other end of which is connected to means 53 for operating the arm designed to move its end provided with the gripping means 52 from a position for picking up the caps 1a,2a, transversely on the outside of the apparatus, into a position for fitting the caps, transversely on the inside of the apparatus, in coaxial alignment with the ends of the cut pipe 1,2, upstream of the cutting means 40 in the longitudinal direction X-X and with gripping means 52 facing the rear of the apparatus.

Figure 5:
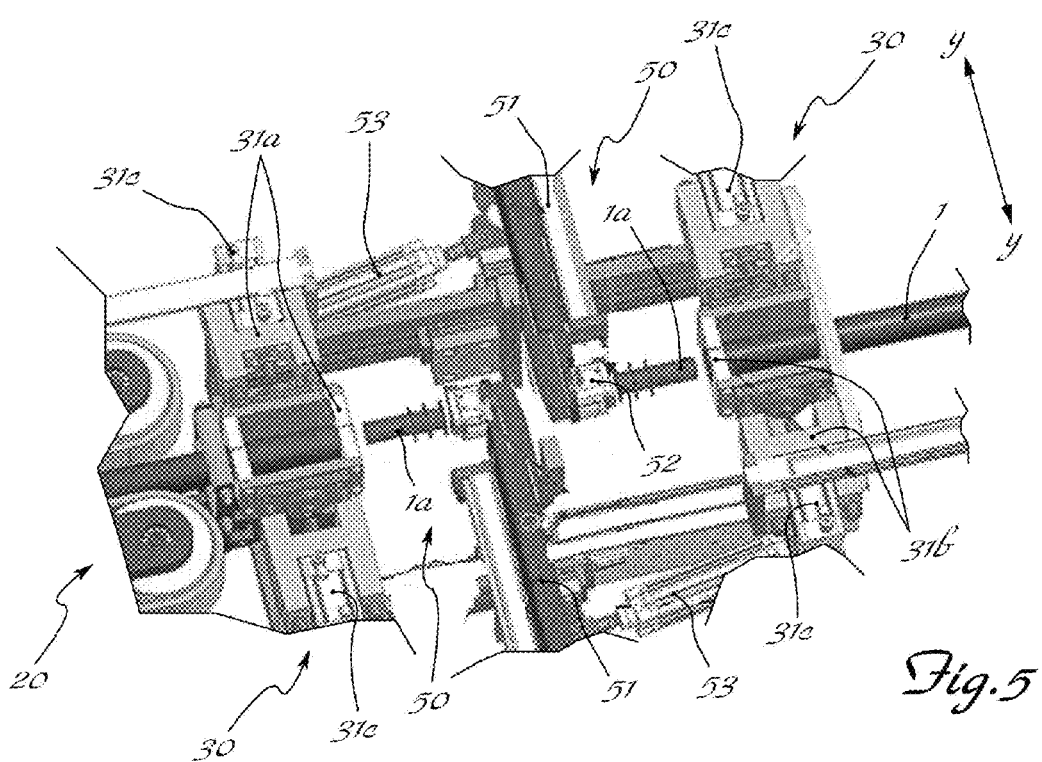
FIG. 5 shows a partial perspective view of the apparatus according to FIG. 2 during insertion, into the line, of the caps to be fitted.
Figure 6:
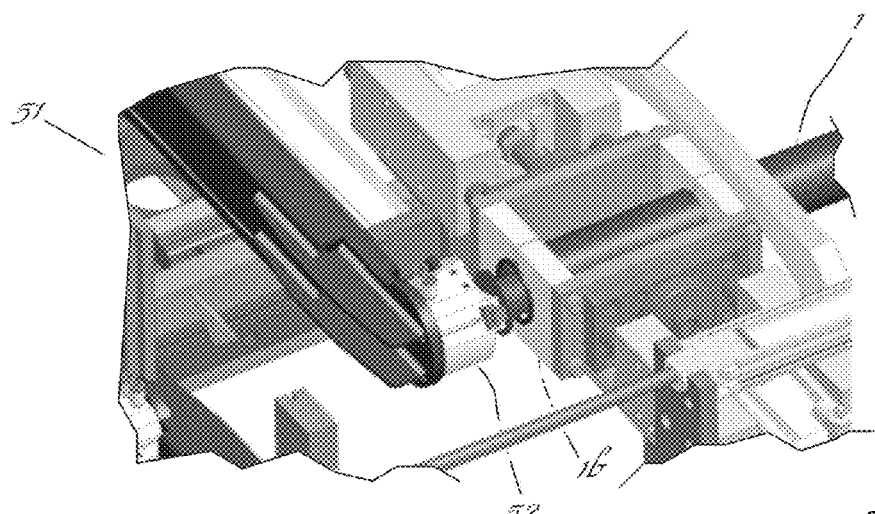
FIGS. 6 and 7 show a partial perspective view of the apparatus according to FIG. 2 during fitting of a smooth or threaded cap, respectively.
Figure 7:
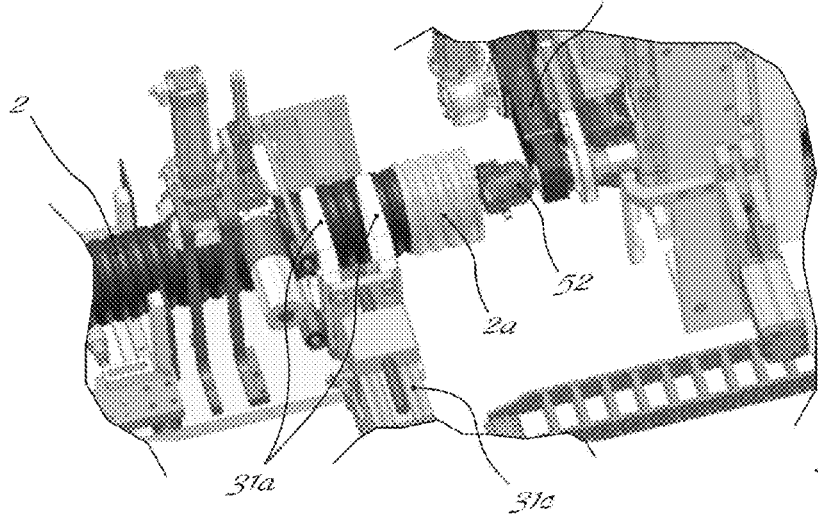
Figure 8:
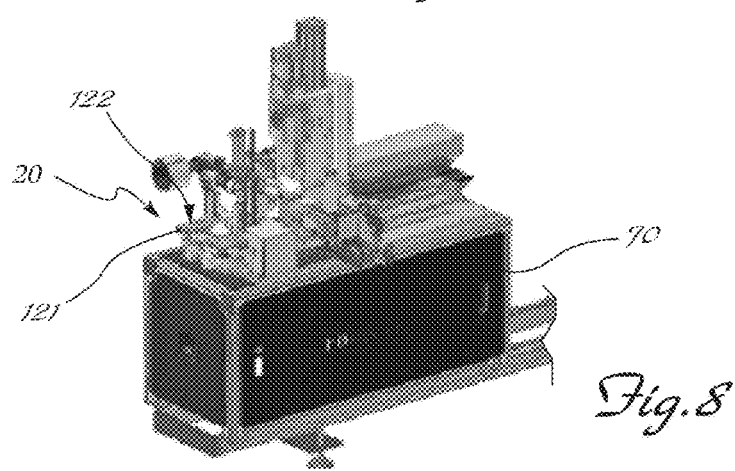
FIG. 8 shows a perspective view of a second embodiment of an apparatus according to aspects of the present disclosure and FIG. 9 shows side views illustrating the operating sequence of the apparatus according to aspects of the present disclosure.

As shown in FIGS. 5 and 6, respectively, the gripping means 52 may be of the gripper type for fitting by means of pressure the caps 1a onto smooth pipes 1 by means of a rectilinear movement, or of the rotating spindle type for fitting threaded caps 2a onto spirally grooved pipes 2. In a preferred embodiment for fitting operations where both the ends of each cut pipe must be closed with a cap, it is envisaged that the means 50 for gripping and fitting the caps 1a,2a comprise a second arm 51 provided with respective means 52 for gripping and fitting a cap 1,2; said second arm 51 is in this case situated downstream of the cutting means 40 and with gripping means 52 facing the front of the apparatus, so as to allow the simultaneous fitting of a cap both onto the terminal cut end of an outgoing pipe and on the front cut end of an incoming pipe.

As shown in FIG. 5, it is envisaged that in a preferred embodiment the two arms 51 are arranged opposite each other and in the transverse direction Y-Y in order to prevent interference during the respective movements.

According to a further embodiment of the apparatus according to the disclosure it is envisaged that in the case of pipes 1,2 with a small diameter the driving means 123 may comprise a single pair of rollers 121 for engaging around the pipe, which can be operated so as to open/close onto it in a manner similar to that described for the driving means 20; the entire apparatus is arranged on a closed container 70, inside which the control and operating devices are arranged.

Figure 1:
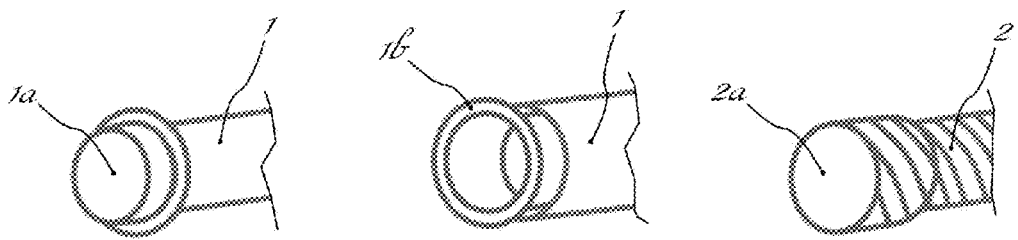
FIG. 1 shows a schematic view of different pipes and corresponding closing caps according to the prior art.
Figure 2:
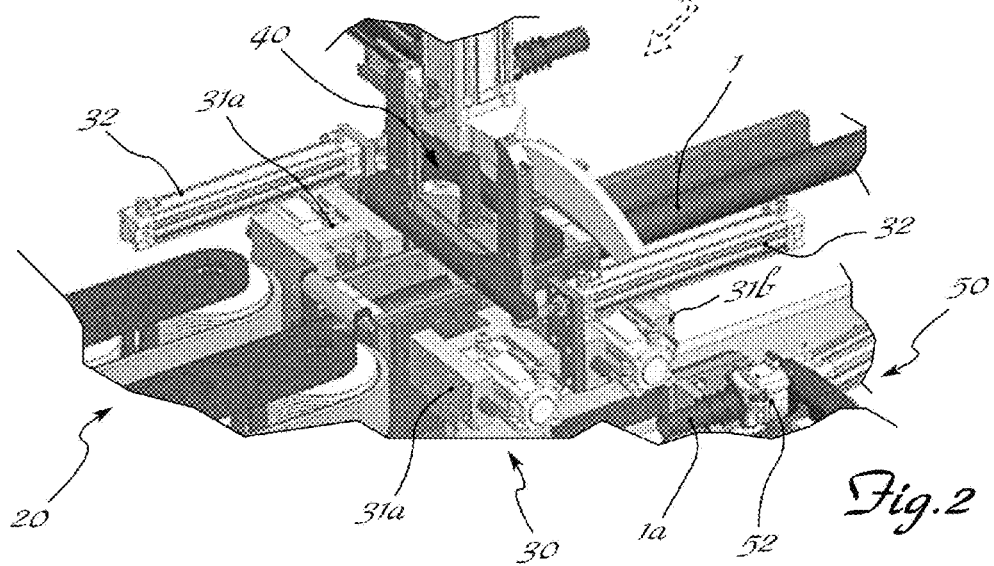
FIG. 2 shows a perspective view of a first embodiment of an apparatus according to aspects of the present disclosure for fitting caps onto a pipe.
Figure 3:
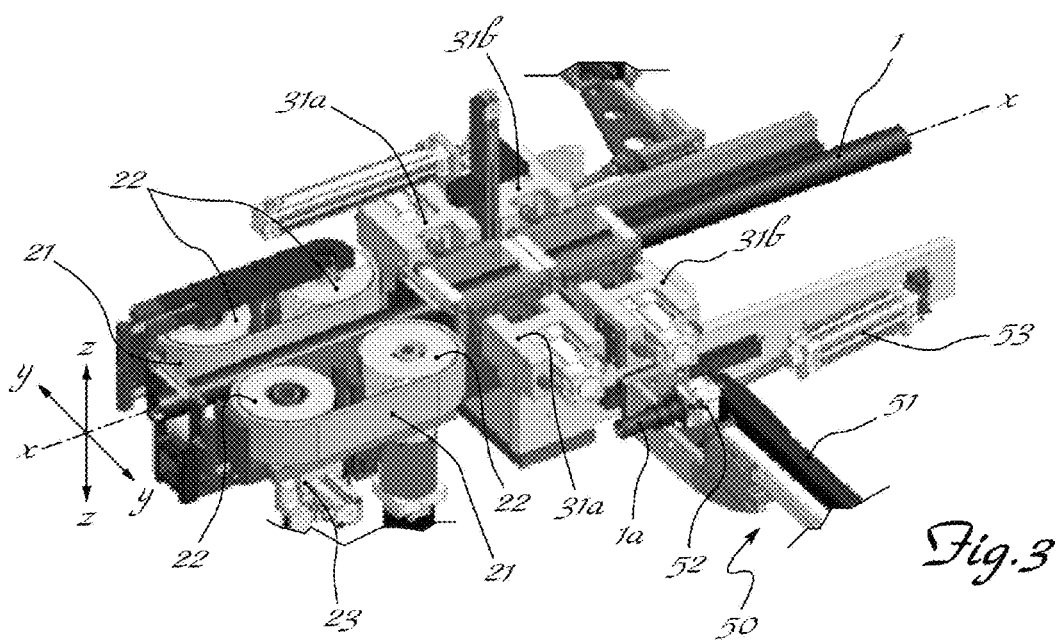
FIG. 3 shows a perspective view of the apparatus according to FIG. 2, partially disassembled.
Figure 4:
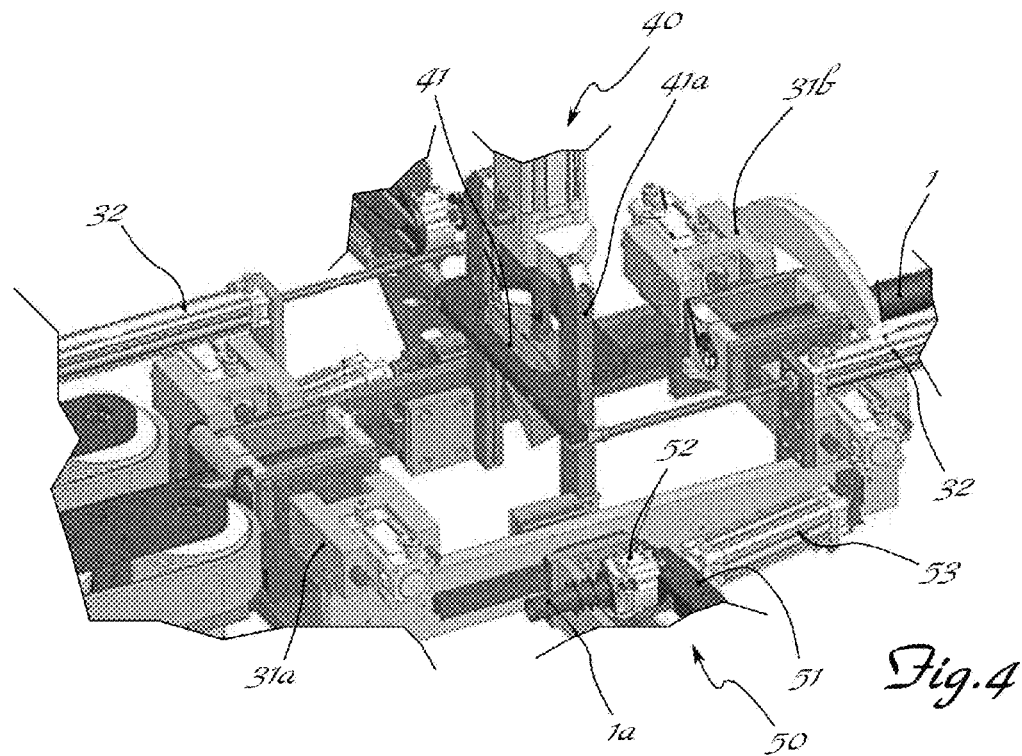
FIG. 4 shows a partial perspective view of the apparatus according to FIG. 2 during separation of the cut pipe.

It is also envisaged that the sequences and the operations of the machine and its various components are actuated by means of a control and operation device 500 (schematically indicated by means of broken lines in FIG. 1) which may be synchronized and/or integrated with the extruder and/or the winder and connected to transducer means for detecting signals emitted by detectors and performing operations which may be electrical, hydraulic or equivalent, conventional per se and not shown or described in detail.

It is also envisaged that, in the case of pipes in the form of bars, the cap-fitting and cutting operations form the end of the production cycle, following which the pipes in bar form may if necessary be directly transferred to apparatus for packaging them.

The machine configuration of the embodiment described above implements the following operating cycle and method (FIG. 9):

a) arrangement of the apparatus (FIG. 9a) in a position between a rear extruder E and a front machine A for winding or packaging the pipes 1,2 and in a rear end-of-travel position 10b with respect to the guides 10, with unit 20 for driving and means 30 for gripping the pipe 1,2 in the open condition in the transverse direction Y-Y, cutting blade 41 raised, arms 51 with end having member 52 for gripping the cap 1a,2a in the cap pick-up position transversely on the outside of the apparatus;

b) feeding of the formed pipe 1,2 output from the extruder E to the apparatus;

c) reception, by the apparatus, of a signal for alignment in the longitudinal direction X-X of a designated point of the pipe for cutting with the cutting blade 41;

d) closing, in the transverse direction Y-Y, of the jaws 31a,31b from the position for disengagement from the pipe 1,2 into the position for gripping and retaining the pipe in the position for relative alignment of the designated cutting point and the cutting blade 41;

e) start of displacement of the apparatus in the longitudinal direction X-X along the structure 10 from the rear end-of-travel position 10b towards the front end-of-travel position 10a and at a speed the same as the speed of feeding of the pipe by the extruder E;

f) operation of the blade 41 for cutting the pipe 1,2 at the designated point for cutting to size;

g) displacement of at least one pair—both pairs in the example shown—of jaws 31a,31b in opposite senses of the longitudinal direction X-X to the spaced position for fitting the caps; the displacement occurs away from the pipe cutting position and upon operation of the respective arm of the movement means 32;

h) movement of the end carrying the means 52 for gripping and fitting the cap of each arm 51 from the transversely external position for gripping the cap 1a,2a into the position for axial alignment of the means 52 for fitting the cap together with the respective cut end of the pipe 1;

i) operation of the means 52 for gripping and fitting the caps 1a,2a so as to fit a respective cap onto each one or more ends of a pipe 1,2 present inside the apparatus; said fitting operation being performed by means of insertion with pressure or screwing by the corresponding application or rotating-spindle means 52;

j) opening of the gripping means 30 into the spaced position for disengagement from the pipe 1,2;

k) operation of the unit 20 for driving the pipe 1,2 until the capped front end of the pipe 1,2 engages with pipe feeding means incorporated in the winding machine A;

l) reception, by the apparatus, of a signal indicating engagement with said pipe winding means A incorporated in the winding machine A;

m) opening of the driving unit 20 of the apparatus into the spaced position of the belts 21 for disengagement from the pipe 1,2 and return of the apparatus into the rear end-of-travel position 10b and simultaneous return of all the units into the start-of-cycle condition;

n) restarting of the cycle.

Preferably, upon starting of the extrusion, cutting and packaging operations, the first part of the extruded pipe fed to the apparatus is cut and discarded and, if required, a corresponding cap is applied to the cut end, such that the first spool produced also has two opposite ends cut with precision and closed by caps.

As from the second consecutive cycle of the apparatus, whenever the pipe 1,2 passing through the apparatus is cut, simultaneously a cap 1a,2a will be fitted both to the rear end of the preceding pipe section, already being wound onto the machine A, and to the front end of the following pipe section which has not yet engaged with the winding machine A.

According to a first example of an embodiment of the step for reception/detection of the designated cutting point, a pipe meter-counting device is provided; this device may be stand-alone or incorporated in the winder, in the cutting and cap-fitting apparatus or in the extruder. With the apparatus in the initial position the distance between the cutting means 41 and said device is fixed and known.

Upon reaching the pipe meter count corresponding to the desired length +/−the distance of the counting apparatus from the means 41—depending on whether the counting apparatus is located upstream or downstream of the cutting means 41—the counting device sends the signal for correct alignment for the cutting-to-size operation to the apparatus, which starts the operations described above in paragraph c) and the following paragraphs. According to a further example of embodiment of the means for detecting and sending the alignment signal for cutting to size, the control and operation means 500 are connected to a meter-counting device, a mark application device and a mark reading device; when the meter-counting device reaches a predetermined number of meters of fed pipe 1, a mark is applied onto the outer surface of the pipe, said mark being subsequently detected by the reading device which sends a signal for detection of the correct cutting point to the control means 500 which coordinate operation of the various units of the apparatus for cutting the caps to the size and fitting them.

It is therefore clear how with embodiments of the apparatus according to the disclosure it is possible to incorporate in the cycle for the production of pipes wound onto spools or pipes in bar form the cutting-to-size and cap-fitting operations on at least one of the cut ends of pipe, without affecting the overall production time, said apparatus being moreover easily combined with any production die for forming and winding or packaging plastic pipes and allowing the fitting of different types of caps onto different types of pipe.

Although described in connection with the fitting of caps, the person skilled in the art may adapt the subject matter of the disclosure in order to fit taps, plugs or other end components for plastic pipes.

Example configurations of an apparatus according to the disclosure may implement a method for fitting caps 1a,2a by means of an automatic apparatus onto at least one end of a pipe 1,2, fed in a longitudinal direction X-X by a pipe-feeding machine E, said apparatus being movable alternately:

in both senses of the longitudinal direction X-X between two opposite ends, i.e. rear end 10b facing the feeding machine E, and front end 10a opposite to the rear end; and comprising:

a rear unit 20 for driving the pipe 1,2 supplied from the forming machine E;

a pipe gripping unit 30;

a unit 40 for cutting the pipe 1,2;

a unit 50 for inserting the caps 1a,2a into the line and fitting them onto the ends of the pipe 1,2;

said method in general comprises the following steps:

a) arrangement of the apparatus between the output end of machine E for feeding plastic pipes and the input end of a pipe bundling machine A, in a rear end-of-travel position 10b, said unit 20 for driving and said unit 30 for gripping the pipe 1,2 being in an open condition in the transverse direction Y-Y in a position for disengagement from the pipe 1,2, the cutting unit 40 being raised in the rest position, and with the unit 50 for fitting the caps 1a,2a in a cap pick-up position outside the apparatus in the transverse direction (Y-Y);

b) feeding, by the feeding machine E, of the formed pipe 1,2 output from said machine;

c) reception, by the apparatus, of a signal for alignment in the longitudinal direction X-X of a designated point of the pipe for cutting by means of the cutting unit 40;

d) closing, in the transverse direction Y-Y, of the gripping unit 30 from the position for disengagement from the pipe 1,2 into the position for gripping and retaining the pipe in the position for relative alignment of the designated cutting point and the cutting unit 40;

e) start of displacement of the apparatus in the longitudinal direction X-X from the rear end-of-travel position 10b towards the front end-of-travel position 10a and at a predefined speed;

f) operation of the cutting unit 40 for cutting the pipe 1,2 at the designated cutting point;

g) opening, in the longitudinal direction X-X, of the gripping unit 30 from a position where it retains the pipe in the cutting position into a position, at a distance therefrom, where it does not interfere with the cap fitting unit 50;

h) operation of the cap fitting unit 50, from the position for gripping the caps 1a,2a, into a position for axial alignment of the cap gripping and fitting means 52 with a respective cut end of the pipe 1,2;

i) operation of the means 52 for gripping and fitting the caps 1a,2a so as to fit a respective cap onto at least one of the ends of the pipe 1,2 present inside the apparatus;

j) opening, in the transverse direction Y-Y, of the gripping unit 30 into the position for disengagement from the pipe 1,2;

k) operation of the unit 20 for driving the pipe 1,2 until the front capped end of the pipe 1,2 engages with pipe feeding means associated with the bundling machine A;

l) reception, by the apparatus, of a signal indicating engagement with said pipe feeding means associated with the bundling machine A;

m) opening of the rollers 21, disengagement of the driving unit 20 from the pipe 1,2 and return of the apparatus into the rear end-of-travel position 10b and simultaneous return of all the units into the start-of-cycle condition.

Moreover, the predetermined speed of longitudinal displacement X-X towards the bundling machine A may be preferably the same as the speed of feeding of the pipe by the feeding machine E or the speed of bundling of the pipe by the machine A; preferably said three speeds are equivalent to each other.

According to some embodiments of the disclosure it is envisaged that the apparatus and the method described may be used in connection with an automatic plant for forming, cutting, capping and bundling in the form of a spool, bar or the like pipes or cables.

Although described in connection with a number of embodiments and a number of preferred examples of embodiments of the disclosure, it is understood that the scope of protection of the present patent is determined solely by the claims below.

The invention claimed is:

1. A method for fitting caps using an apparatus for cutting and fitting caps onto at least one cut end of a pipe supplied by a machine, the apparatus comprising:

a rear unit for driving the pipe in a longitudinal direction, the pipe being supplied from the machine;

a pipe gripping unit located in the longitudinal direction between the rear unit and a front end of two opposite end-of-travel ends including a rear end facing the machine and the front end opposite to the rear end;

a cutting unit for cutting the pipe, the cutting unit being located in the longitudinal direction between the rear unit and the front end; and an inserting unit for inserting the caps into a line and fitting the caps onto the ends of the pipe, the cutting unit being located in the longitudinal direction between the rear unit and the front end;

wherein the apparatus is movable alternately in both directions along a longitudinal direction between the two opposite end-of-travel ends including the rear end facing the machine and the front end opposite to the rear end;

wherein the method comprises:

a) arranging, in a rear end-of-travel position, of the apparatus between an output end of the machine supplying the pipe and an input end of a pipe bundling machine;

b) presetting said rear unit for driving the pipe and said pipe gripping unit for gripping the pipe in an open condition in a transverse direction in a position for disengagement from the pipe, the cutting unit being raised in a rest position, and the inserting unit for fitting the caps in a cap pick-up position outside the apparatus in the transverse direction;

c) feeding of the pipe to the apparatus by the machine;

d) receiving, by the apparatus, of a signal for alignment, in the longitudinal direction of a designated point of the pipe for cutting with the cutting unit;

e) closing, in the transverse direction, of the pipe gripping unit from the position for disengagement from the pipe into a position for gripping and retaining the pipe in the position for relative alignment of the designated cutting point and the cutting unit;

f) starting displacement of the apparatus in the longitudinal direction from the rear end towards the front end and at a predefined speed;

g) operation of the cutting unit for cutting the pipe at the designated cutting point;

h) opening, in the longitudinal direction, of the pipe gripping unit from a position where it retains the pipe in the cutting position into a position, at a distance therefrom, where it does not interfere with the cap fitting unit;

i) operating of the cap fitting unit, from the position for gripping the caps, into a position for axial alignment of a cap gripper and fitter with a respective cut end of the pipe;

l) operating of the cap gripper and fitter for gripping and fitting the caps so as to fit a respective cap onto the at least one end of the pipe present inside the apparatus;

m) opening, in the transverse direction, the pipe gripping unit into the position for disengagement from the pipe;

n) operating the rear unit for driving the pipe until a capped front end of the pipe engages with a pipe recaller associated with the pipe bundling machine;

o) receiving, by the apparatus, a signal indicating engagement with said pipe recaller associated with the bundling machine;

p) disengaging of the rear unit for driving the pipe from the pipe and returning of the apparatus to the rear end with simultaneous return of units into a cycle start condition.

2. The method according to claim 1, wherein said predefined speed is of displacement of the apparatus towards the front end and is the same as the speed of feeding of the pipe by the machine.

3. The method according to claim 1, wherein said predefined speed is of displacement of the apparatus towards the front end and is the same as a speed of bundling of the pipe by the pipe bundling machine.

4. The method according to claim 1, wherein said operation for fitting the caps is performed using pressure-fitting.

5. The method according to claim 1, wherein said operation of fitting the caps is performed screwing.

6. The method according to claim 1, wherein during step i) for operation of the cap fitting unit, the gripper and fitter of the caps are operated so as to fit a respective cap onto each end of the pipe present inside the apparatus.

7. The method according to claim 1, wherein during initial execution of the method cycle, the following additional step is performed:
f1) extraction from the apparatus of a first pipe section formed by the machine and fed to the apparatus between the steps f) for operation of the cutting unit and g) opening of the pipe gripping unit in the longitudinal direction.

8. The method according to claim 1, wherein step d) of reception/detection of the signal for alignment of the designated cutting point with a cutting element comprises the following operations:
providing a pipe meter-counting device arranged in front of or behind, and at a known distance from the cutting element with the apparatus in the rear end;
counting, by the meter-counting device, of the meters of pipe traveled by the device itself until a count value equal to a desired length of pipe +/− the value of said known distance between the counting device and the cutting element is reached;
sending of the alignment signal to the apparatus for cutting to size.

9. The method according to claim 1, wherein step d) of reception/detection of the signal for alignment of the designated cutting point with the cutting element comprises the following operations:
providing a meter-counting device, a mark application device and a mark reading device connected to a controller associated with the apparatus;
counting of the pipe meters by the meter-counting device until a count value equal to a desired length is reached;
application, by the mark application device, of a mark on an outer surface of the pipe at a point situated at a predefined distance from the designated cutting point;
detection of the mark by the reading device;
sending of a marked point detection signal to the controller;
processing and sending, by the controller, of said signal for alignment of the designated cutting point.

10. An apparatus for cutting and fitting caps onto at least one cut end of a pipe supplied by a machine, the apparatus comprising:
a rear unit for driving the pipe in a longitudinal direction, the pipe being supplied from the machine;
a pipe gripping unit located in the longitudinal direction between the rear unit and a front end of two opposite end-of-travel ends including a rear end facing the machine and the front end opposite to the rear end;
a cutting unit for cutting the pipe, the cutting unit being located in the longitudinal direction between the rear unit and the front end; and
an inserting unit for inserting the caps into a line and fitting the caps onto the ends of the pipe, the cutting unit being located in the longitudinal direction between the rear unit and the front end;
wherein the apparatus is movable alternately in both directions along a longitudinal direction between the two opposite end-of-travel ends including the rear end facing the machine and the front end opposite to the rear end.

11. The apparatus according to claim 10, wherein said unit for driving the pipe comprises:
a pair of belts arranged parallel to the longitudinal direction and endlessly wound around a respective pair of rollers in turn aligned in pairs along the longitudinal direction, at least one of the two rollers of the pair being suitable for rotational operation of the belts.

12. The apparatus according to claim 11, wherein the two belts with respective rollers are mounted on an associated slide which can be displaced in both directions along a transverse direction from a position spaced apart for opening and a position close together for closing the belts onto the pipe with which they engage for driving thereof.

13. The apparatus according to claim 10, wherein said rear unit for driving the pipe comprises:
a pair of belts arranged parallel to the longitudinal direction and endlessly wound around a respective roller and arranged opposite each other in a transverse direction, the two rollers being suitable for rotational operation of the belts.

14. The apparatus according to claim 10, wherein said pipe gripping unit for gripping the pipe comprises:
a first pair of jaws situated opposite each other and movable in a transverse direction upon operation of a device configured to move the first pair of jaws from a position spaced apart for opening and disengagement from the pipe, into a position close together for closing, gripping and retaining the pipe (1,2); and
a second pair of jaws arranged alongside the first jaws in the longitudinal direction and also situated opposite each other and movable upon operation in the transverse direction, from an open position for disengagement from the pipe into a closed position for gripping and retaining the pipe.

15. The apparatus according to claim 14, wherein at least one of said two pairs of jaws, is able to move, upon operation of movement device, in both directions along the longitudinal direction, from a relative position close to the other pair of jaws, corresponding to a position for cutting the pipe, into a position spaced from said other pair of jaws, corresponding to a position for fitting a cap.

16. The apparatus according to claim 14, wherein both pairs of jaws are movable upon operation of respective movement device in both directions along the longitudinal direction, the movement of the pairs of jaws having a symmetrical travel and separating/closing time.

17. The apparatus according to claim 14, wherein the cutting unit is arranged in a position substantially centred, in the longitudinal direction, between the two jaws, when the said jaws are in a position close together.

18. The apparatus according to claim 10, wherein said cutting unit for cutting the pipe comprises a cutting blade extending in a transverse direction and movable along respective guides in both directions along a vertical direction, the cutting blade capable of being used in a guillotine.

19. The apparatus according to claim 10, wherein said inserting unit for inserting the caps into the line and for fitting them onto the ends of the pipe comprises:
at least one first transverse arm, a first end of which carries a gripping and fitting device for gripping and fitting a cap onto a cut end of the pipe and the other end of which is connected to an operating device for operating the arm designed to move the first end provided with the gripping and fitting device from a position for picking up the caps into a position for fitting the caps, where said gripping and fitting device are in coaxial alignment with the ends of the cut pipe and facing said cut end of the pipe intended to receive the cap.

20. The apparatus according to claim 19, wherein said inserting unit for inserting the caps into the line and fitting them comprises:
a second arm provided with the gripping and fitting device for gripping and fitting a cap onto the other cut end of the pipe; said second arm being situated on the opposite side to the first arm in the longitudinal direction relative to the cutting unit and with the gripping and fitting device facing the opposite direction along the longitudinal axis compared to the gripping and fitting device of said first arm and in coaxial alignment with said other cut end of the pipe so as to allow simultaneous fitting of a cap both onto a terminal cut end of an outgoing pipe and on a front cut end of an incoming pipe.

21. The apparatus according to claim 20, wherein the first arm and the second arm of the unit for inserting the caps into the line and fitting them onto the ends of the pipe are arranged opposite each other in a transverse direction and on opposite sides of the apparatus.

22. The apparatus according to claim 19, wherein said gripping and fitting device is movable with a rectilinear movement along the longitudinal axis for pressure-fitting the caps onto the pipe.

23. The apparatus according to claim 19, wherein said gripping and fitting device incorporates a rotating spindle, the gripping and fitting device fitting threaded caps by screwing the threaded caps onto the pipe that is spirally grooved.

24. The apparatus according to claim 10, wherein the apparatus is mounted on a closed container that also houses internally a plurality of control and operation devices for coordinating and implementing a plurality of operating sequences and operating movements of the machine.

25. The apparatus according to claim 10, wherein the apparatus further comprises a support and guide structure for supporting and guiding the movability between said opposite end-of-travel ends, said support and guide structure extending in the longitudinal direction between the rear end facing the machine and the front end opposite to the rear end.

26. An automatic plant for forming, cutting, capping and bundling pipes being fed in the plant, comprising:
a feeding machine;
a bundling machine;
an apparatus for cutting and fitting caps onto at least one cut end of a pipe that is supplied by the machine, the pipe being directed in a longitudinal direction towards the bundling machine, said apparatus being arranged in the longitudinal direction between an output end of the machine and input end of the bundling machine; and
movable alternately between two ends including a rear end facing the machine, and a front end opposite to the rear end, of a support and guide structure extending in the longitudinal direction;
wherein said apparatus for cutting and fitting caps onto at least one cut end of the pipe comprises:
a rear unit for driving the pipe in the longitudinal direction, the pipe being supplied from the machine;
a pipe gripping unit located in the longitudinal direction between the rear unit and a front end of two opposite end-of-travel ends including a rear end facing the machine and the front end opposite to the rear end;
a cutting unit for cutting the pipe, the cutting unit being located in the longitudinal direction between the rear unit and the front end; and
an inserting unit for inserting the caps into a line and fitting the caps onto the ends of the pipe, the cutting unit being located in the longitudinal direction between the rear unit and the front end;
wherein the apparatus is movable alternately in both directions along a longitudinal direction between the two opposite end-of-travel ends including the rear end facing the machine and the front end opposite to the rear end.

27. The plant according to claim 26, wherein said machine is a pipe forming machine, wherein said bundling machine is a machine for winding up and/or packaging pipes in a spool form.

28. The plant according to claim 26, wherein said machine is a continuous extruder and/or said bundling machine is a machine for bundling and/or packaging pipes in the form of bars.

29. The plant according to claim 26, wherein said apparatus for cutting and fitting caps onto at least one cut end of the pipe is designed to move in the longitudinal direction at a speed of feeding of the pipe by the machine and/or at a speed of bundling of the pipe by the bundling machine.

30. The plant according to claim 29, wherein said bundling machine is designed to bundle the pipe at a speed of feeding of the said pipe by the machine.

* * * * *